April 8, 1958   B. B. MOHS   2,830,002
LENS STRUCTURE
Filed July 3, 1953

INVENTOR.
BRUCE B. MOHS
BY
Attorney

United States Patent Office 2,830,002
Patented Apr. 8, 1958

2,830,002

LENS STRUCTURE

Bruce B. Mohs, Shorewood Hills, Wis.

Application July 3, 1953, Serial No. 365,897

3 Claims. (Cl. 154—110)

This invention relates to a lens structure for an electric lamp and to a method for providing same.

Lamb bulbs comprising electrically conducting filaments adapted to emit light rays and glass envelopes or bulbs surrounding said filaments and adapted to protect said filaments when heated from the effect of atmospheric oxygen are often utilized in devices wherein the bulbs are not protected from untoward environmental influences. For example, flashlight bulbs are utilized in conjunction with flash-light batteries in devices wherein the bulbs are not protected from jars, scrapes, bumps, and the like which the device may undergo. Likewise, lamps of the well known household variety are often utilized in similarly exposed positions. Similarly electric lamps of the type wherein a portion of the bulb serves as a reflector, adapted to concentrate the light produced by the filaments into a straight beam and well known for use in automotive vehicles, are often utilized in exposed positions where they are subject to the effects of rocks and other debris thrown up from the ground by the wheels of passing vehicles. An application wherein such bulbs are particularly subject to failure is that of tail light service on trucks; rocks thrown up by the rear wheels of the truck or by the wheels of passing vehicles limit the useful life of a lamp in such service to a very low figure.

My invention makes it possible for lamp bulbs of the well known types to be utilized in such applications by providing a lens structure of novel shock-absorbing form.

Accordingly, it is an object of this invention to provide a superior lens structure for electric lamps.

It is another object to provide a supplementary lens for electric lamps wherein a portion of the bulb thereof is adapted to serve as a reflector.

Another object is such a supplementary lens which is adapted to immunize the bulb to fracture by low velocity missiles.

Another object is a shock absorbing lens device adapted to protect electric lamps having glass bulbs.

Further objects and the applicability of the invention will become apparent from the drawings and the following detailed description in which it is my intention to illustrate the invention without thereby limiting its scope to less than that of all equivalents, and in which like reference numerals refer to like parts and in which.

Figure 1:
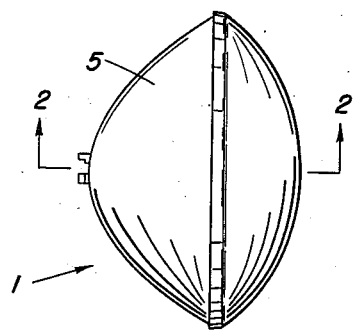
Figure 1 is an elevation of an electric lamp wherein a portion of the glass envelope thereof is adapted to serve as a reflector.
Figure 2:
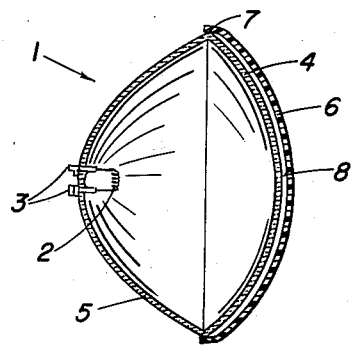
Figure 2 is a cross-sectional view on lines 2—2 of the lamp of Figure 1.

Referring now to Figures 1 and 2, the numeral 1 indicates an electric lamp of the type wherein a portion of the bulb serves as a reflector, such as a Seal Beam lamp. Filaments 2, inside the bulb, are connected by suitable means, sealed in the glass of the bulb, to terminals 3 projecting from one side of the bulb. Said connecetions may extend through and be sealed in the portion 5 of the bulb which is adapted to serve as a reflector and which may be silvered or otherwise metalized on its interior surface to facilitate its use for this purpose. The portion 4 of the bulb which is normally adapted to serve as a lens for the lamp may be sealed at its outer marginal edge to the outer marginal edge of portion 5 by any suitable means or may be made integral therewith as shown. Synthetic resin lens 6, preferably comprising principally polymethyl methacrylate, may have its outer marginal edge sealed to the outer marginal edges of portions 4 and 5 at 7 as shown in such manner as to provide vacuum or air space 8 between lens 4 and lens 6. This may be accomplished in the manner hereinafter described.

A disc 6' of acrylic resin, preferably comprising principally polymethyl methacrylate, having a diameter somewhat greater than the maximum diameter of the bulb to which it is desired to attach the lens structure of the invention, is first placed in an oven. The oven is maintained at a temperature of from 220° to 230° F. and is provided with means to maintain uniform heat distribution. In the oven the disc is supported by being placed on top of tapered ring 9 which may be aluminum or any other metal having a coefficient of expansion greater than that of the glass in the bulb. A crucible may suitably be utilized in place of the ring. The greatest diameter of the ring or crucible may be greater or smaller (as shown) than the diameter of the disc 6' and is preferably slightly greater than the diameter of the bulb at 7. From this diameter the ring or crucible 9 may be tapered inwardly in such manner that it is provided at the bottom of the tapering portion with an inside diameter slightly smaller than the diameter of disc 6' and also slightly smaller than the diameter of lamp 1 at 7.

Figure 3:
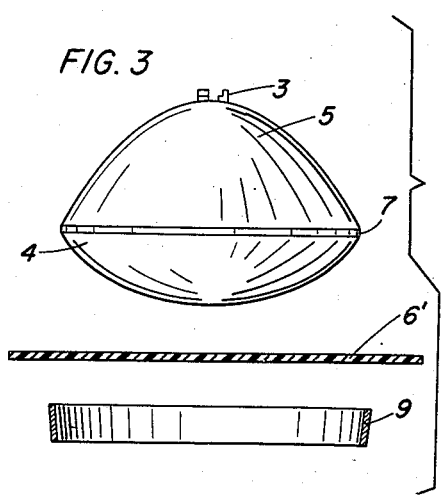
Figure 3 is a cross-sectional view showing a step in the preparation of the lens structure of my invention.
Figure 4:
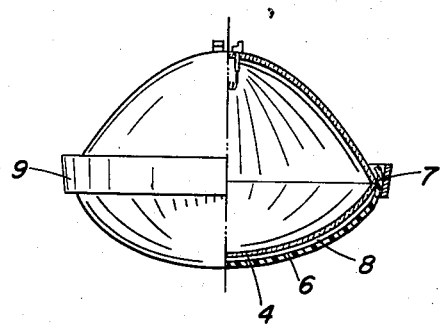
Figure 4 is a partially cross-sectional view showing another step in the process.

When the plastic is thoroughly heated and as soon as it start to sag into the crucible, the elements are oriented as shown in Figure 3 and the bulb is forced downward into the acrylic resin until the downward movement of the periphery of the bulb is halted by the converging walls of the tapered crucible or ring as shown in Figure 4. Thus the disc 6' is formed into a lens shape so as to form lens structure 6 sealed to bulb 1 at 7.

Such sealing may be facilitated by preparing the bulb by first heating at approximately 200–250° F. (and then drying if such heating is accomplished by immersing the bulb in water) and by then coating that portion of bulb 1 adjacent its maximum diameter, at 7, with a suitable adhesive such as for example monomeric methyl methacrylate.

The resulting assembly, which is shown in Figure 4, may then be placed in a refrigerated chamber and the temperature gradually reduced to below room temperature or below 32° F. and preferably to from 0° to 10° F. Since the thermal coefficient of expansion of the metal from which crucible 9 is formed is greater than that of the glass from which the bulb is formed (which may be for example about $.833 \times 10^{-5}$ at 40° C.), the ring or crucible forces the periphery of the acrylic resin lens tightly against the bulb assuring a suitably tight seal at 7.

Aluminum, which has a thermal coefficient of expansion of about $2.313 \times 10^{-5}$ at 40° C. has been found quite suitable for the material from which ring 9 may be made, when the glass of the bulb has the coefficient mentioned above.

The assembly illustrated in Figure 4 may then be removed from the freezing unit and allowed to return to room temperature at which time the assembly may be removed from ring 9 and excess synthetic resin may be trimmed from the edges of the synthetic resin disc to form the article indicated as 1 in Figure 1.

As the temperature of the assembly returns to room temperature, the acrylic resin which has a coefficient of expansion slightly greater than the glass, expands and thus space 8 between lens 6 and lens 4 may be formed. Space 8 may be a total vacuum or may be a partial vacuum or may even contain air at atmospheric pressure but in any event it is believed that generally if any air is contained in space 8 it is below atmospheric pressure and it has been observed that condensation behind the plastic lens is prevented by space 8. The relationship of lens 6 to lens 4 provided with space 8 therebetween is such that articles impinging against the surface of lens 6 may deflect lens 6 but do not shatter lens 4 because of the cushioning effect of air in space 8 or because of the spring action of lens 6, which may be deflected into space 8 without damage to lens 4 or by a combination of these two effects.

The coefficient of thermal expansion of polymethyl methacrylate at 40° C. is believed to be $4.9 \times 10^{-5}$ and the glass of the bulb may have any suitable composition which provides a glass having a coefficient of expansion substantially lower than this.

In preparation for carrying out the process the acrylic resin disc may be heated at from about 200° to 300° F.; a temperature of about 230° F. is generally preferable.

In place of the monomer cement described above, which may consist of monomeric methyl methacrylate dissolved in a 50% mixture of methylene dichloride, other acrylic monomer cements dissolved in suitable solvents such as acetic acid, ethylene dichloride and methylene dichloride may be used.

The device of the invention has been found particularly suitable for use as a stop light or tail light mounted on the back of semi-trailer or large truck rigs. Since lamps in this location are subjected to particularly violent abuse, it has heretofore been generally infeasible to use lamps of the sealed, internal reflector type in such service. My invention makes possible the use of such lamps, with concomitant advantages, in this service.

Figure 5:
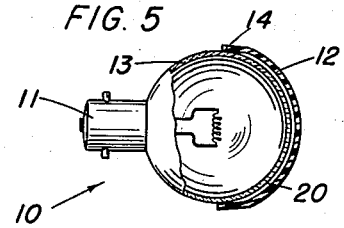
Figure 5 is a cross-sectional view of another embodiment wherein the invention is applied to a lamp provided with a spherical envelope or bulb.

The invention may be suitably applied to other types of bulbs. For example, as shown in Figure 5, a flash light bulb 10 or other spherical bulb with a bayonet type base 11 as shown or screw type base may be provided with lens 12 of the invention, attached to the glass envelope 13 of the bulb at 14.

Figure 6:
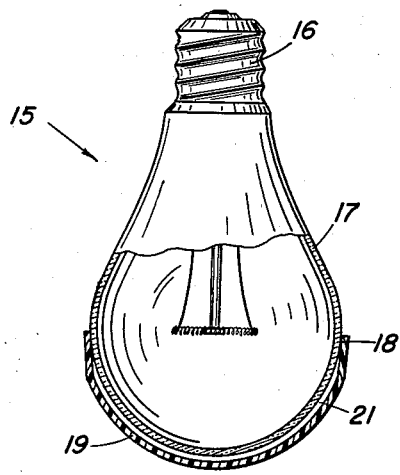
Figure 6 is a cross-sectional view showing the application of the invention to a portion of a pear shaped lamp.

Similarly, as shown in Figure 6, a pear shaped bulb indicated generally as 15 provided with any suitable sort of base such as mogul base 16 may have attached to its glass envelope 17 at 18 the lens 19 of the invention. Space 20 between envelope 13 and lens 12 and space 21 between envelope 17 and lens 19 are adapted to prevent the condensation of moisture and to prevent breakage of envelopes 13 and 17 respectively in the same manner as described in connection with space 8 between lens 4 and lens 6.

The use of a freezing unit to accomplish the cooling to 0° to 10° F. has been described but any suitable cooling means may be used.

For tail light purposes an acrylic resin sheet which has dye incorporated in it to provide a red color is generally preferable. The acrylic resin may be dyed with any suitable color depending on the purpose for which the bulb is to be used.

In addition to the uses described heretofore the invention has applicability for other uses such as for example: emergency lamps for drag lines, construction equipment and the like, Christmas tree ornaments, emergency vehicle lights, theatre aisle lights, exit lamps, fog lamps for vehicles, and amber warning lamps for vehicles, traffic control lamps, theatrical stage lighting and the like.

It has been found that by providing a bulb with the plastic lens structure of the invention the resultant bulb not only resists breakage caused by gravel thrown up by the trailer wheels on a truck and resists other mechanical abuse but that a tail light prepared according to the invention is bright enough to be used as a back-up light; the device may be rotated about its longitudinal, horizontal axis for correct aiming; the tail light produced in this manner generally greatly exceeds the requirements of most state statutes relating to visibility of tail lights and the effectiveness of such tail lights is particularly great in fog or other conditions of low visibility; the lens does not appreciably cut down the effective candle power of the lamp and provides an optically correct structure if an acrylic resin comprising principally polymethyl methacrylate is used.

The foregoing disclosure illustrates the applicability of the invention but the scope of the invention is to be limited only by the claims.

Having thus disclosed my invention, I claim:

1. The process of producing a lamp, having a glass envelope, supported in a truncated cylindrical member of separate said lens from the adjacent portion of said glass envelope by a sealed off space, which comprises forcing a heated lamp provided with a glass envelope into a heated disc of acrylic synthetic resin having a thermal coefficient of expansion greater than that of the glass in said envelope, supported in a truncated cylindrical member of a material having a coefficient of expansion greater than that of the glass in said envelope until further motion of the lamp is prevented by the periphery of said envelope becoming adjacent to that portion of said truncated member having the same diameter, and then cooling the assembly to below 32° F.

2. The process of making a lamp, having a glass envelope with a supplementary lens attached thereto to separate said lens from the adjacent portion of said glass envelope by a sealed off space, which comprises heating a lamp provided with an envelope of glass to approximately 200° to 250° F., heating a truncated cylindrical member having a thermal coefficient of expansion greater than that of the glass in said envelope and a size sufficient to allow said lamp to pass only partially therethrough and a disc of acrylic synthetic resin supported thereon to about 220° F. to 300° F., and then forcing said lamp downward against said disc and into said truncated member until the motion of the lamp is halted by said truncated member and then cooling the assembly.

3. The process of providing a lamp having a glass envelope with a supplementary lens attached thereto separated from the adjacent portion of said glass envelope by a sealed-off space which comprises supporting a sheet of acrylic synthetic resin on a tapered ring, heating said lamp, said disc and said ring to above 200° F. and forcing said lamp downward into said disc until halted by said tapered ring.

References Cited in the file of this patent

UNITED STATES PATENTS

| | | |
|---|---|---|
| 1,801,396 | Thatcher | Apr. 21, 1931 |
| 2,303,198 | Cunnington | Nov. 24, 1942 |
| 2,362,172 | Swanson | Nov. 7, 1944 |
| 2,382,939 | Koch | Aug. 14, 1945 |
| 2,520,691 | Otis | Aug. 29, 1950 |
| 2,548,353 | Cunningham | Apr. 10, 1951 |

U. S. DEPARTMENT OF COMMERCE
PATENT OFFICE

CERTIFICATE OF CORRECTION

Patent No. 2,830,002                            April 8, 1958

Bruce B. Mohs

It is hereby certified that error appears in the printed specification of the above numbered patent requiring correction and that the said Letters Patent should read as corrected below.

Column 2, line 6, for "connecetions" read -- connections --; line 42, for "start" read -- starts --; column 4, line 25, strike out ", supported in a truncated cylindrical member of" and insert instead -- with a supplementary lens attached thereto to --.

Signed and sealed this 20th day of May 1958.

(SEAL)
Attest:

KARL H. AXLINE                                            ROBERT C. WATSON
Attesting Officer                                        Commissioner of Patents